US010645446B2

(12) United States Patent
Deshpande

(10) Patent No.: US 10,645,446 B2
(45) Date of Patent: May 5, 2020

(54) SERVICE GUIDE ENCAPSULATION

(71) Applicant: Sharp Kabushiki Kaisha, Sakai, Osaka (JP)

(72) Inventor: Sachin G. Deshpande, Vancouver, WA (US)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/655,369

(22) Filed: Oct. 17, 2019

(65) Prior Publication Data

US 2020/0053418 A1 Feb. 13, 2020

Related U.S. Application Data

(63) Continuation of application No. 16/188,559, filed on Nov. 13, 2018, now Pat. No. 10,491,945, which is a continuation of application No. 15/543,329, filed as application No. PCT/JP2016/000147 on Jan. 13, 2016, now Pat. No. 10,171,867.

(60) Provisional application No. 62/105,605, filed on Jan. 20, 2015.

(51) Int. Cl.

| | |
|---|---|
| *H04N 7/16* | (2011.01) |
| *H04N 21/438* | (2011.01) |
| *H04N 21/435* | (2011.01) |
| *H04N 21/8543* | (2011.01) |
| *H04N 21/262* | (2011.01) |
| *H04N 21/4402* | (2011.01) |
| *H04H 60/72* | (2008.01) |

(52) U.S. Cl.

CPC ........ *H04N 21/4382* (2013.01); *H04H 60/72* (2013.01); *H04N 21/26283* (2013.01); *H04N 21/435* (2013.01); *H04N 21/4402* (2013.01); *H04N 21/8543* (2013.01)

(58) Field of Classification Search

CPC ....................... H04N 21/2362; H04N 21/4382
See application file for complete search history.

(56) References Cited

U.S. PATENT DOCUMENTS

| | | | | |
|---|---|---|---|---|
| 9,331,802 | B2 * | 5/2016 | Jansky | H04H 60/39 |
| 2007/0045416 | A1 * | 3/2007 | Paila | H04H 60/39 235/435 |
| 2011/0283303 | A1 * | 11/2011 | Jung | H04H 20/57 725/1 |

FOREIGN PATENT DOCUMENTS

WO WO-2008143446 A1 * 11/2008 ......... H04N 21/6131

OTHER PUBLICATIONS

Deshpande, "Service Guide Encapsulation", U.S. Appl. No. 16/188,559, filed Nov. 13, 2018

* cited by examiner

*Primary Examiner* — Gigi L Dubasky
(74) *Attorney, Agent, or Firm* — Keating & Bennett, LLP

(57) ABSTRACT

A system for generating, providing and/or receiving an encapsulated service guide data.

1 Claim, 7 Drawing Sheets

| Data Field Name | Data Type |
|---|---|
| Service_Guide_Delivery_Unit { | |
| Unit_Header { | |
| extension_offset | uimsbf32 |
| reserved | 16 bits |
| n_o_service_guide_fragments | uimsbf24 |
| for(i=0; i< n_o_service_guide_fragments; i++) { | |
| fragmentTransportID[i] | uimsbf32 |
| fragmentVersion[i] | uimsbf32 |
| offset[i] | uimsbf32 |
| } | |
| } | |
| Unit_Payload { | |
| for(i=0; i< n_o_service_guide_fragments; i++) { | |
| fragmentEncoding[i] | uimsbf8 |
| if(fragmentEncoding[i]=0) { | |
| fragmentType | uimsbf8 |
| XMLFragment | bytestring |
| } | |
| else if(fragmentEncoding[i]=1) { | |
| validFrom | uimsbf32 |
| validTo | uimsbf32 |
| fragmentID | bytestring |
| SDPfragment | bytestring |
| } | |
| else if(fragmentEncoding[i]=2) { | |
| validFrom | uimsbf32 |
| validTo | uimsbf32 |
| fragmentID | bytestring |
| USBDfragment | bytestring |
| } | |
| else if(fragmentEncoding[i]=3) { | |
| validFrom | uimsbf32 |
| validTo | uimsbf32 |
| fragmentID | bytestring |
| ADPfragment | bytestring |
| } | |
| } | |
| } | |
| if(extension_offset>0) { | |
| extension_type | uimsbf8 |
| next_extension_offset | uimsbf32 |
| extension_data | bitstring |
| } | |
| } | |

| Data Field Name | Data Type |
|---|---|
| Service_Guide_Delivery_Unit { | |
|     Unit_Header { | |
|         extension_offset | uimsbf32 |
|         reserved | 16 bits |
|         n_o_service_guide_fragments | uimsbf24 |
|         for(i=0; i< n_o_service_guide_fragments; i++) { | |
|             fragmentTransportID[i] | uimsbf32 |
|             fragmentVersion[i] | uimsbf32 |
|             offset[i] | uimsbf32 |
|         } | |
|     } | |
|     Unit_Payload { | |
|         for(i=0; i< n_o_service_guide_fragments; i++) { | |
|             fragmentEncoding[i] | uimsbf8 |
|             if(fragmentEncoding[i]=0) { | |
|                 fragmentType | uimsbf8 |
|                 XMLFragment | bytestring |
|             } | |
|             else if(fragmentEncoding[i]=1) { | |
|                 validFrom | uimsbf32 |
|                 validTo | uimsbf32 |
|                 fragmentID | bytestring |
|                 SDPfragment | bytestring |
|             } | |
|             else if(fragmentEncoding[i]=2) { | |
|                 validFrom | uimsbf32 |
|                 validTo | uimsbf32 |
|                 fragmentID | bytestring |
|                 USBDfragment | bytestring |
|             } | |
|             else if(fragmentEncoding[i]=3) { | |
|                 validFrom | uimsbf32 |
|                 validTo | uimsbf32 |
|                 fragmentID | bytestring |
|                 ADPfragment | bytestring |
|             } | |
|         } | |
|     } | |
|     if(extension_offset>0) { | |
|         extension_type | uimsbf8 |
|         next_extension_offset | uimsbf32 |
|         extension_data | bitstring |
|     } | |
| } | |

FIG. 4

| Data Field Name | Semantics |
|---|---|
| extension_offset | Offset in bytes from the start of the Unit_Payload to the start of the first extension. Set to 0 if there is no extension Present. |
| reserved | A bitfield reserved for future extensions of BCAST. All bits in this field SHALL be set to 0 in an SGDU conforming to this specification. Terminals MAY choose to ignore this field. |
| n_o_service_guide_fragments | Number of Service Guide fragments encapsulated in this specific Delivery Unit. |
| offset[i] | Offset in bytes from the start of the Unit_Payload to the start of the fragment_encoding field of the i:th Service Guide fragment. The offset list is sorted in ascending order. |
| fragmentTransportID[i] | Signals the identifier of the i:th Service Guide fragment which is defined for transport |
| fragmentV ersion[i] | Signals the version of the i:th Service Guide fragment. Note: The scope of the fragmentVersion is limited to this transport session. The value of fragmentVersion can turn over from 2^32-1 to 0. |
| fragmentEncoding[i] | Signals the encoding of the i:th Service Guide fragment, with the following values:<br>0 – XML encoded OMA BCAST Service Guide fragment<br>1 – SDP fragment<br>2 – MBMS User Service Bundle Description (USBD) as specified in "Multimedia Broadcast/Multicast Service (MBMS); Protocols and codecs", 3rd Generation Partnership Project TS 26.346 Release 6 (URL: http://www.3gpp.org/ftp/specs)<br>3 – XML encoded Associated Delivery Procedure as specified in "File and Stream Distribution for Mobile Broadcast Services", Open Mobile Alliance™, OMA-TSBCAST_Distribution-V1_0, (URL: http://www.openmobilealliance.org)<br>4-127 – reserved for future BCAST extensions 128-255 – available for proprietary extensions |
| fragmentType[i] | This field signals the type of an XML encoded BCAST Service Guide fragment, with the following values:<br>0 – unspecified<br>1 – 'Service' Fragment<br>2 – 'Content' fragment<br>3 – 'Schedule' Fragment<br>4 – 'Access' Fragment<br>5 – 'PurchaseItem' Fragment<br>6 – 'PurchaseData' Fragment<br>7– 'PurchaseChannel' Fragment<br>8 – 'PreviewData' Fragment<br>9 – 'InteractivityData' Fragment<br>10-127 – reserved for BCAST extensions<br>128-255 – available for proprietary extensions |
| fragmentID | Null-terminated string containing the fragment ID of an SDP or MBMS USBD or Associated Delivery Procedure fragment as referenced from an 'Access' |

FIG. 5A

| | |
|---|---|
| | fragment via SessionDescriptionReference.<br>Note: for an XML encoded OMA BCAST Service Guide fragment, this information is contained in the fragment itself. |
| validFrom | 32 bit word representation of the validFrom value of an SDP or MBMS USBD or Associated Delivery Procedure fragment. This field is expressed as the first 32bits integer part of NTP time stamp. When set to "0" the interpretation is that "validFrom" is undefined. Note: for an XML encoded OMA BCAST Service Guide fragment, this information is contained in the fragment itself. |
| validTo | 32 bit word representation of the validTo value of an SDP or MBMS USBD or Associated Delivery Procedure Description fragment. This field is expressed as the first 32bits integer part of NTP time stamp. When set to "0" the interpretation is that "validTo" is undefined.<br>Note: for an XML encoded OMA BCAST Service Guide fragment, this information is contained in the fragment itself. |
| XMLfragment | String containing the actual XML data of the encapsulated Service Guide fragment without the termination character. |
| SDPfragment | String containing the actual SDP data, without termination character. |
| USBDfragment | String containing the actual MBMS USBD data, without termination character. |
| ADPfragment | String containing the actual XML data of the encapsulated Associated Delivery Procedure fragment, without termination character. |
| extension_type | Signals the type of the extension.<br>0-127 – reserved for BCAST extensions<br>128-255 – available for proprietary extensions<br>Terminals MAY discard unknown extensions. In any case, they SHALL NOT get into an error state when they encounter unknown extensions. |
| next_extension_offset | Offset in bytes from the start of the current extension to the start of the next extension. Set to 0 if there is no next extension. The start of an extension is assumed to be the position of the extension type. |
| extension_data | Content of the extension. |

FIG. 5B

SERVICE GUIDE ENCAPSULATION

TECHNICAL FIELD

The present disclosure relates generally to a service guide.

BACKGROUND ART

A broadcast service is capable of being received by all users having broadcast receivers. Broadcast services can be roughly divided into two categories, namely, a radio broadcast service carrying only audio and a multimedia broadcast service carrying audio, video and data. Such broadcast services have developed from analog services to digital services. More recently, various types of broadcasting systems (such as a cable broadcasting system, a satellite broadcasting system, an Internet based broadcasting system, and a hybrid broadcasting system using both a cable network, Internet, and/or a satellite) provide high quality audio and video broadcast services along with a high-speed data service. Also, broadcast services include sending and/or receiving audio, video, and/or data directed to an individual computer and/or group of computers and/or one or more mobile communication devices.

In addition to more traditional stationary receiving devices, mobile communication devices are likewise configured to support such services. Such configured mobile devices have facilitated users to use such services while on the move, such as mobile phones. An increasing need for multimedia services has resulted in various wireless/broadcast services for both mobile communications and general wire communications. Further, this convergence has merged the environment for different wire and wireless broadcast services.

Open Mobile Alliance (OMA), is a standard for interworking between individual mobile solutions, serves to define various application standards for mobile software and Internet services. OMA Mobile Broadcast Services Enabler Suite (OMA BCAST) is a specification designed to support mobile broadcast technologies. The OMA BCAST defines technologies that provide IP-based mobile content delivery, which includes a variety of functions such as a service guide, downloading and streaming, service and content protection, service subscription, and roaming.

The foregoing and other objectives, features, and advantages of the invention will be more readily understood upon consideration of one or more of the following detailed description of the invention, taken in conjunction with the accompanying drawings.

SUMMARY OF INVENTION

One embodiment of the present invention discloses a method for decoding a service guide associated with a video bitstream comprising: (a) receiving a service guide fragment within said service guide; (b) receiving a service guide delivery unit structure within said service guide fragment that is used for encapsulating service guide fragments within said video bitstream; (c) receiving a unit header structure within said service guide delivery unit structure; (d) receiving an extension offset field within said unit header structure, wherein said extension offset field is zero in said service guide delivery unit structure corresponding to a particular service guide delivery unit structure specification; (e) receiving said extension offset field within said unit header structure, wherein said extension offset field is ignored for values other than zero in said service guide delivery unit structure corresponding to said particular service guide delivery unit structure specification; (f) decoding said service guide.

Another embodiment of the present invention discloses a method for decoding a service guide associated with a video bitstream comprising: (a) receiving a service guide fragment within said service guide; (b) receiving a service guide delivery unit structure within said service guide fragment that is used for encapsulating service guide fragments within said video bitstream; (c) receiving a unit payload structure within said service guide delivery unit structure; (d) receiving a fragment encoding field within said unit payload structure, where said fragment encoding field does not take a value of 1 or 2 or 3 for any value of i in the range of 0 to the total number of service guide fragments within said service guide delivery unit structure, wherein there is at least one value of i in the range of 0 to said total number of said service guide fragments within said service guide delivery unit structure for which said fragment encoding field is equal to zero corresponding to a particular service guide delivery unit structure specification, wherein data of said fragment encoding field is ignored for values other than zero in said unit payload structure corresponding to said particular service guide delivery unit structure specification; (e) decoding said service guide.

Another embodiment of the present invention discloses a method for decoding a service guide associated with a video bitstream comprising: (a) receiving a service guide fragment within said service guide; (b) receiving a service guide delivery unit structure within said service guide fragment that is used for encapsulating service guide fragments within said video bitstream; (c) receiving a unit payload structure within said service guide delivery unit structure; (d) receiving a fragment encoding field and a fragment type field within said unit payload structure, where when said fragment encoding field is equal to 0 a fragment type field does not take a value of 4 or 5 or 6 or 7 or 8 or 9 for any value of i in the range of 0 to the total number of service guide fragments within said service guide delivery unit structure, wherein there is at least one value of i in the range of 0 to said total number of said service guide fragments within said service guide delivery unit structure for which data of said fragment type field is equal to 0 or 1 or 2 or 3 and said fragment encoding field is equal to 0 in a particular service guide delivery unit structure specification, wherein data of a XML fragment field is ignored if an associated said fragment type field has a value equal to 0 or greater than 3 in said particular service guide delivery unit structure specification; (e) decoding said service guide.

BRIEF DESCRIPTION OF DRAWINGS

FIG. 4 is an exemplary service guide delivery unit syntax.

FIG. 5A is an exemplary service guide delivery unit semantics.

FIG. 5B is an exemplary service guide delivery unit semantics.

DESCRIPTION OF EMBODIMENTS

Figure 1:
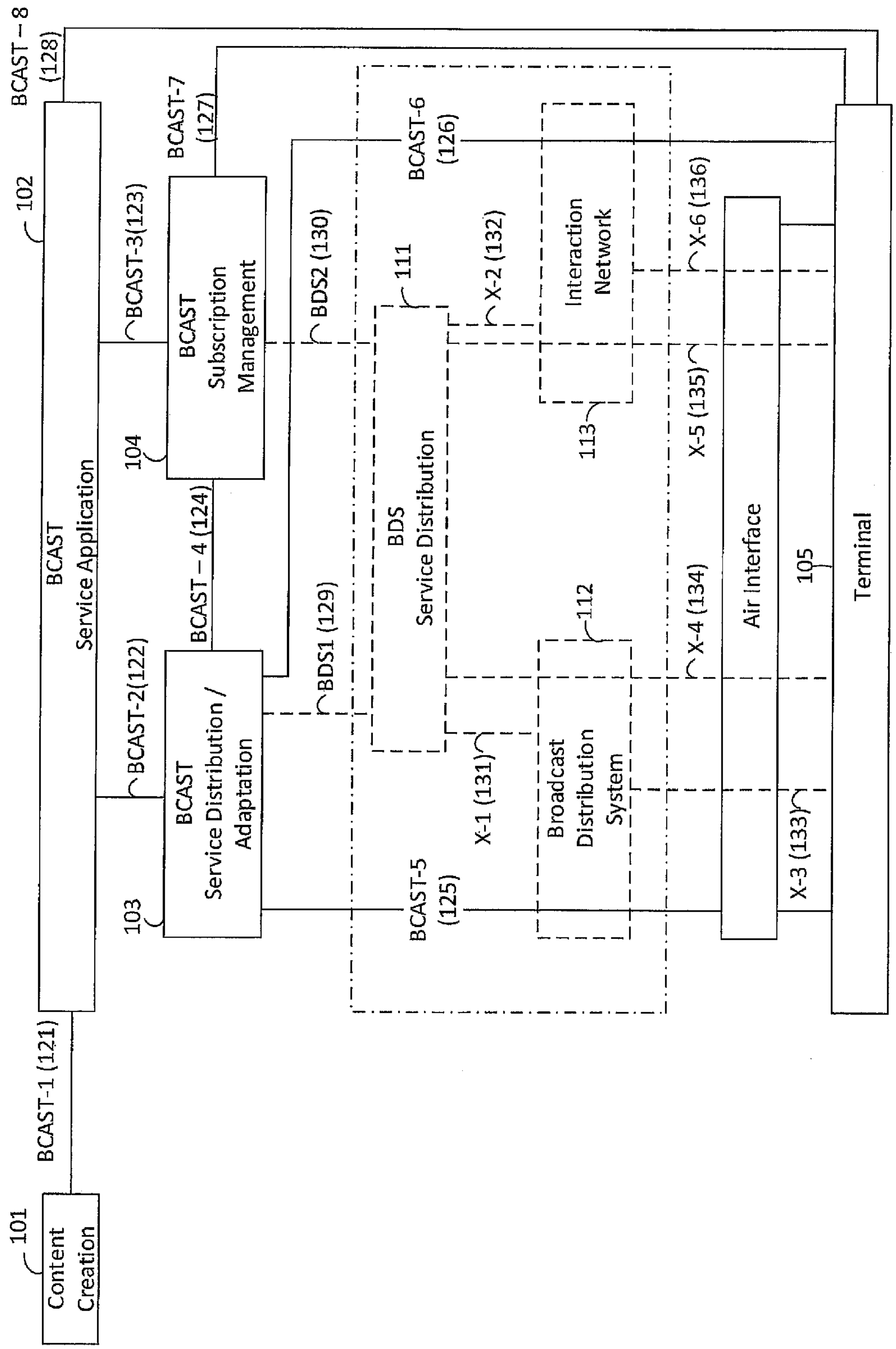
FIG. 1 is a block diagram illustrating logical architecture of a BCAST system specified by OMA BCAST working group in an application layer and a transport layer.

Referring to FIG. 1, a logical architecture of a broadcast system specified by OMA (Open Mobile Alliance) BCAST may include an application layer and a transport layer. The logical architecture of the BCAST system may include a Content Creation (CC) 101, a BCAST Service Application 102, a BCAST Service Distribution/Adaptation (BSDA) 103, a BCAST Subscription Management (BSM) 104, a Terminal 105, a Broadcast Distribution System (BDS) Service Distribution 111, a BDS 112, and an Interaction Network 113. It is to be understood that the broadcast system and/or receiver system may be reconfigured, as desired. It is to be understood that the broadcast system and/or receiver system may include additional elements and/or fewer elements, as desired.

In general, the Content Creation (CC) 101 may provide content that is the basis of BCAST services. The content may include files for common broadcast services, e.g., data for a movie including audio and video. The Content Creation 101 provides a BCAST Service Application 102 with attributes for the content, which are used to create a service guide and to determine a transmission bearer over which the services may be delivered.

In general, the BCAST Service Application 102 may receive data for BCAST services provided from the Content Creation 101, and converts the received data into a form suitable for providing media encoding, content protection, interactive services, etc. The BCAST Service Application 102 provides the attributes for the content, which is received from the Content Creation 101, to the BSDA 103 and the BSM 104.

In general, the BSDA 103 may perform operations, such as file/streaming delivery, service gathering, service protection, service guide creation/delivery and service notification, using the BCAST service data provided from the BCAST Service Application 102. The BSDA 103 adapts the services to the BDS 112.

In general, the BSM 104 may manage, via hardware or software, service provisioning, such as subscription and charging-related functions for BCAST service users, information provisioning used for BCAST services, and mobile terminals that receive the BCAST services.

In general, the Terminal 105 may receive content/service guide and program support information, such as content protection, and provides a broadcast service to a user. The BDS Service Distribution 111 delivers mobile broadcast services to a plurality of terminals through mutual communication with the BDS 112 and the Interaction Network 113.

In general, the BDS 112 may deliver mobile broadcast services over a broadcast channel, and may include, for example, a Multimedia Broadcast Multicast Service (MBMS) by 3rd Generation Project Partnership (3GPP), a Broadcast Multicast Service (BCMCS) by 3rd Generation Project Partnership 2 (3GPP2), a DVB-Handheld (DVB-H) by Digital Video Broadcasting (DVB), or an Internet Protocol (IP) based broadcasting communication network. The Interaction Network 113 provides an interaction channel, and may include, for example, a cellular network.

The reference points, or connection paths between the logical entities of FIG. 1, may have a plurality of interfaces, as desired. The interfaces are used for communication between two or more logical entities for their specific purposes. A message format, a protocol and the like are applied for the interfaces. In some embodiments, there are no logical interfaces between one or more different functions.

BCAST-1 121 is a transmission path for content and content attributes, and BCAST-2 122 is a transmission path for a content-protected or content-unprotected BCAST service, attributes of the BCAST service, and content attributes.

BCAST-3 123 is a transmission path for attributes of a BCAST service, attributes of content, user preference/subscription information, a user request, and a response to the request. BCAST-4 124 is a transmission path for a notification message, attributes used for a service guide, and a key used for content protection and service protection.

BCAST-5 125 is a transmission path for a protected BCAST service, an unprotected BCAST service, a content-protected BCAST service, a content-unprotected BCAST service, BCAST service attributes, content attributes, a notification, a service guide, security materials such as a Digital Right Management (DRM) Right Object (RO) and key values used for BCAST service protection, and all data and signaling transmitted through a broadcast channel.

BCAST-6 126 is a transmission path for a protected BCAST service, an unprotected BCAST service, a content-protected BCAST service, a content-unprotected BCAST service, BCAST service attributes, content attributes, a notification, a service guide, security materials such as a DRM RO and key values used for BCAST service protection, and all data and signaling transmitted through an interaction channel.

BCAST-7 127 is a transmission path for service provisioning, subscription information, device management, and user preference information transmitted through an interaction channel for control information related to receipt of security materials, such as a DRM RO and key values used for BCAST service protection.

BCAST-8 128 is a transmission path through which user data for a BCAST service is provided. BDS-1 129 is a transmission path for a protected BCAST service, an unprotected BCAST service, BCAST service attributes, content attributes, a notification, a service guide, and security materials, such as a DRM RO and key values used for BCAST service protection.

BDS-2 130 is a transmission path for service provisioning, subscription information, device management, and security materials, such as a DRM RO and key values used for BCAST service protection.

X-1 131 is a reference point between the BDS Service Distribution 111 and the BDS 112. X-2 132 is a reference point between the BDS Service Distribution 111 and the Interaction Network 113. X-3 133 is a reference point between the BDS 112 and the Terminal 105. X-4 134 is a reference point between the BDS Service Distribution 111 and the Terminal 105 over a broadcast channel. X-5 135 is a reference point between the BDS Service Distribution 111 and the Terminal 105 over an interaction channel. X-6 136 is a reference point between the Interaction Network 113 and the Terminal 105.

Figure 2:
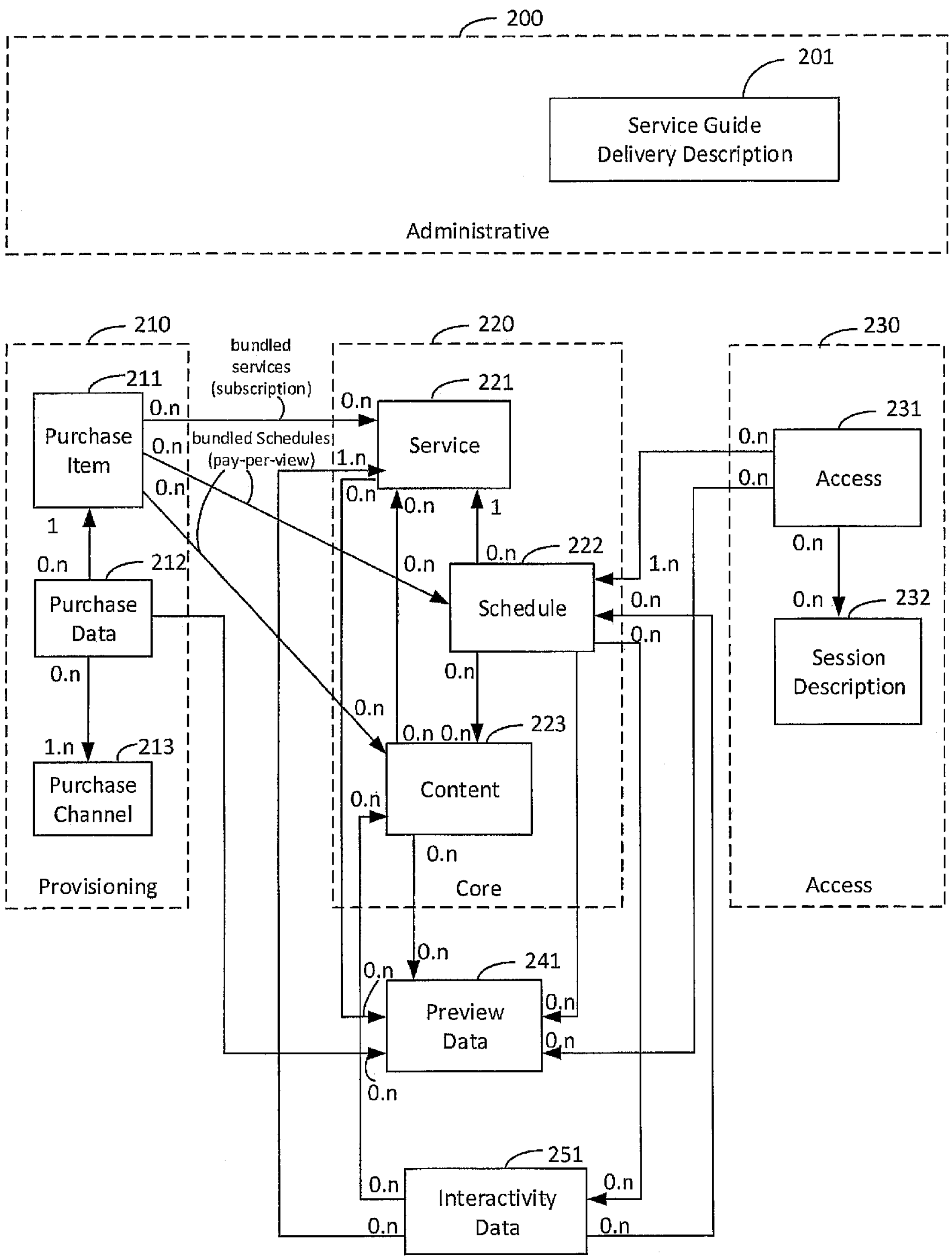
FIG. 2 is a diagram illustrating a structure of a service guide for use in the OMA BCAST system.

Referring to FIG. 2, an exemplary service guide for the OMA BCAST system is illustrated. For purposes of illustration, the solid arrows between fragments indicate the reference directions between the fragments. It is to be understood that the service guide system may be reconfigured, as desired. It is to be understood that the service guide system may include additional elements and/or fewer elements, as desired. It is to be understood that functionality of the elements may be modified and/or combined, as desired.

Figure 2A:
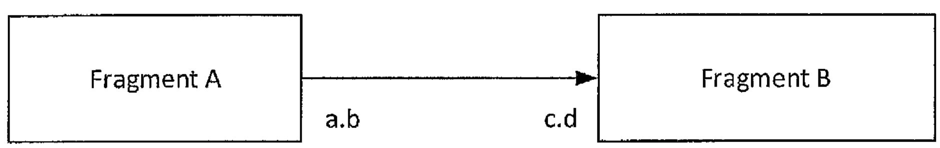
FIG. 2A is a diagram showing cardinalities and reference direction between service guide fragments.

FIG. 2A is a diagram showing cardinalities and reference direction between service guide fragments. The meaning of the cardinalities shown in the FIG. 2 is the following: One instantiation of Fragment A as in FIG. 2A references c to d instantiations of Fragment B. If c=d, d is omitted. Thus, if c>0 and Fragment A exists, at least c instantiation of Fragment B must also exist, but at most d instantiations of Fragment B may exist. Vice versa, one instantiation of Fragment B is referenced by a to b instantiations of Fragment A. If a=b, b is omitted. The arrow connection from Fragment A pointing to Fragment B indicates that Fragment A contains the reference to Fragment B.

With respect to FIG. 2, in general, the service guide may include an Administrative Group 200 for providing basic information about the entire service guide, a Provisioning Group 210 for providing subscription and purchase information, a Core Group 220 that acts as a core part of the service guide, and an Access Group 230 for providing access information that control access to services and content.

The Administrative Group 200 may include a Service Guide Delivery Descriptor (SGDD) block 201. The Provision Group 210 may include a Purchase Item block 211, a Purchase Data block 212, and a Purchase Channel block 213. The Core Group 220 may include a Service block 221, a Schedule block 222, and a Content block 223. The Access Group 230 may include an Access block 231 and a Session Description block 232.

The service guide may further include Preview Data 241 and Interactivity Data 251 in addition to the four information groups 200, 210, 220, and 230.

The aforementioned components may be referred to as basic units or fragments constituting aspects of the service guide, for purposes of identification.

The SGDD fragment 201 may provide information about a delivery session where a Service Guide Delivery Unit (SGDU) is located. The SGDU is a container that contains service guide fragments 211, 212, 213, 221, 222, 223, 231, 232, 241, and 251, which constitute the service guide. The SGDD may also provide the information on the entry points for receiving the grouping information and notification messages.

The Service fragment 221, which is an upper aggregate of the content included in the broadcast service, may include information on service content, genre, service location, etc. In general, the 'Service' fragment describes at an aggregate level the content items which comprise a broadcast service. The service may be delivered to the user using multiple means of access, for example, the broadcast channel and the interactive channel. The service may be targeted at a certain user group or geographical area. Depending on the type of the service it may have interactive part(s), broadcast-only part(s), or both. Further, the service may include components not directly related to the content but to the functionality of the service such as purchasing or subscription information. As the part of the Service Guide, the 'Service' fragment forms a central hub referenced by the other fragments including 'Access', 'Schedule', 'Content' and 'PurchaseItem' fragments. In addition to that, the 'Service' fragment may reference 'PreviewData' fragment. It may be referenced by none or several of each of these fragments. Together with the associated fragments the terminal may determine the details associated with the service at any point of time. These details may be summarized into a user-friendly display, for example, of what, how and when the associated content may be consumed and at what cost.

The Access fragment 231 may provide access-related information for allowing the user to view the service and delivery method, and session information associated with the corresponding access session. As such, the 'Access' fragment describes how the service may be accessed during the lifespan of the service. This fragment contains or references Session Description information and indicates the delivery method. One or more 'Access' fragments may reference a 'Service' fragment, offering alternative ways for accessing or interacting with the associated service. For the Terminal, the 'Access' fragment provides information on what capabilities are required from the terminal to receive and render the service. The 'Access' fragment provides Session Description parameters either in the form of inline text, or through a pointer in the form of a URI to a separate Session Description. Session Description information may be delivered over either the broadcast channel or the interaction channel.

The Session Description fragment 232 may be included in the Access fragment 231, and may provide location information in a Uniform Resource Identifier (URI) form so that the terminal may detect information on the Session Description fragment 232. The Session Description fragment 232 may provide address information, codec information, etc., about multimedia content existing in the session. As such, the 'SessionDescription' is a Service Guide fragment which provides the session information for access to a service or content item. Further, the Session Description may provide auxiliary description information, used for associated delivery procedures. The Session Description information is provided using either syntax of SDP in text format, or through a 3GPP MBMS User Service Bundle Description [3GPP TS 26.346] (USBD). Auxiliary description information is provided in XML format and contains an Associated Delivery Description as specified in [BCAST10-Distribution]. Note that in case SDP syntax is used, an alternative way to deliver the Session Description is by encapsulating the SDP in text format in 'Access' fragment. Note that Session Description may be used both for Service Guide delivery itself as well as for the content sessions.

The Purchase Item fragment 211 may provide a bundle of service, content, time, etc., to help the user subscribe to or purchase the Purchase Item fragment 211. As such, the 'PurchaseItem' fragment represents a group of one or more services (i.e. a service bundle) or one or more content items, offered to the end user for free, for subscription and/or purchase. This fragment can be referenced by 'PurchaseData' fragment(s) offering more information on different service bundles. The 'PurchaseItem' fragment may be also associated with: (1) a 'Service' fragment to enable bundled services subscription and/or, (2) a 'Schedule' fragment to enable consuming a certain service or content in a certain timeframe (pay-per-view functionality) and/or, (3) a 'Content' fragment to enable purchasing a single content file related to a service, (4) other 'PurchaseItem' fragments to enable bundling of purchase items.

The Purchase Data fragment 212 may include detailed purchase and subscription information, such as price information and promotion information, for the service or content bundle. The Purchase Channel fragment 213 may provide access information for subscription or purchase. As such, the main function of the 'PurchaseData' fragment is to express all the available pricing information about the associated purchase item. The 'PurchaseData' fragment collects the information about one or several purchase channels and may be associated with PreviewData specific to a certain service or service bundle. It carries information about pricing of a service, a service bundle, or, a content item. Also, information about promotional activities may be included in this fragment. The SGDD may also provide information regarding entry points for receiving the service guide and grouping information about the SGDU as the container.

The Preview Data fragment 241 may be used to provide preview information for a service, schedule, and content. As such, 'PreviewData' fragment contains information that is used by the terminal to present the service or content outline to users, so that the users can have a general idea of what the service or content is about. 'PreviewData' fragment can include simple texts, static images (for example, logo), short video clips, or even reference to another service which could be a low bit rate version for the main service. 'Service', 'Content', 'PurchaseData', 'Access' and 'Schedule' fragments may reference 'PreviewData' fragment.

The Interactivity Data fragment 251 may be used to provide an interactive service according to the service, schedule, and content during broadcasting. More detailed information about the service guide can be defined by one or more elements and attributes of the system. As such, the InteractivityData contains information that is used by the terminal to offer interactive services to the user, which is associated with the broadcast content. These interactive services enable users to e.g. vote during TV shows or to obtain content related to the broadcast content. 'InteractivityData' fragment points to one or many 'InteractivityMedia' documents that include xhtml files, static images, email template, SMS template, MMS template documents, etc. The 'InteractivityData' fragment may reference the 'Service', 'Content' and 'Schedule' fragments, and may be referenced by the 'Schedule' fragment.

The 'Schedule' fragment defines the timeframes in which associated content items are available for streaming, downloading and/or rendering. This fragment references the 'Service' fragment. If it also references one or more 'Content' fragments or 'InterativityData' fragments, then it defines the valid distribution and/or presentation timeframe of those content items belonging to the service, or the valid distribution timeframe and the automatic activation time of the InteractivityMediaDocuments associated with the service. On the other hand, if the 'Schedule' fragment does not reference any 'Content' fragment(s) or InteractivityDat'a fragment(s), then it defines the timeframe of the service availability which is unbounded.

The 'Content' fragment gives a detailed description of a specific content item. In addition to defining a type, description and language of the content, it may provide information about the targeted user group or geographical area, as well as genre and parental rating. The 'Content' fragment may be referenced by Schedule, PurchaseItem or 'InteractivityData' fragment. It may reference 'PreviewData' fragment or 'Service' fragment.

The 'PurchaseChannel' fragment carries the information about the entity from which purchase of access and/or content rights for a certain service, service bundle or content item may be obtained, as defined in the 'PurchaseData' fragment. The purchase channel is associated with one or more Broadcast Subscription Managements (BSMs). The terminal is only permitted to access a particular purchase channel if it is affiliated with a BSM that is also associated with that purchase channel. Multiple purchase channels may be associated to one 'PurchaseData' fragment. A certain end-user can have a "preferred" purchase channel (e.g. his/her mobile operator) to which all purchase requests should be directed. The preferred purchase channel may even be the only channel that an end-user is allowed to use.

The ServiceGuideDeliveryDescriptor is transported on the Service Guide Announcement Channel, and informs the terminal the availability, metadata and grouping of the fragments of the Service Guide in the Service Guide discovery process. A SGDD allows quick identification of the Service Guide fragments that are either cached in the terminal or being transmitted. For that reason, the SGDD is preferably repeated if distributed over broadcast channel. The SGDD also provides the grouping of related Service Guide fragments and thus a means to determine completeness of such group. The ServiceGuideDeliveryDescriptor is especially useful if the terminal moves from one service coverage area to another. In this case, the ServiceGuideDeliveryDescriptor can be used to quickly check which of the Service Guide fragments that have been received in the previous service coverage area are still valid in the current service coverage area, and therefore don't have to be re-parsed and re-processed.

Although not expressly depicted, the fragments that constitute the service guide may include element and attribute values for fulfilling their purposes. In addition, one or more of the fragments of the service guide may be omitted, as desired. Also, one or more fragments of the service guide may be combined, as desired. Also, different aspects of one or more fragments of the service guide may be combined together, reorganized, and otherwise modified, or constrained as desired.

Figure 3:
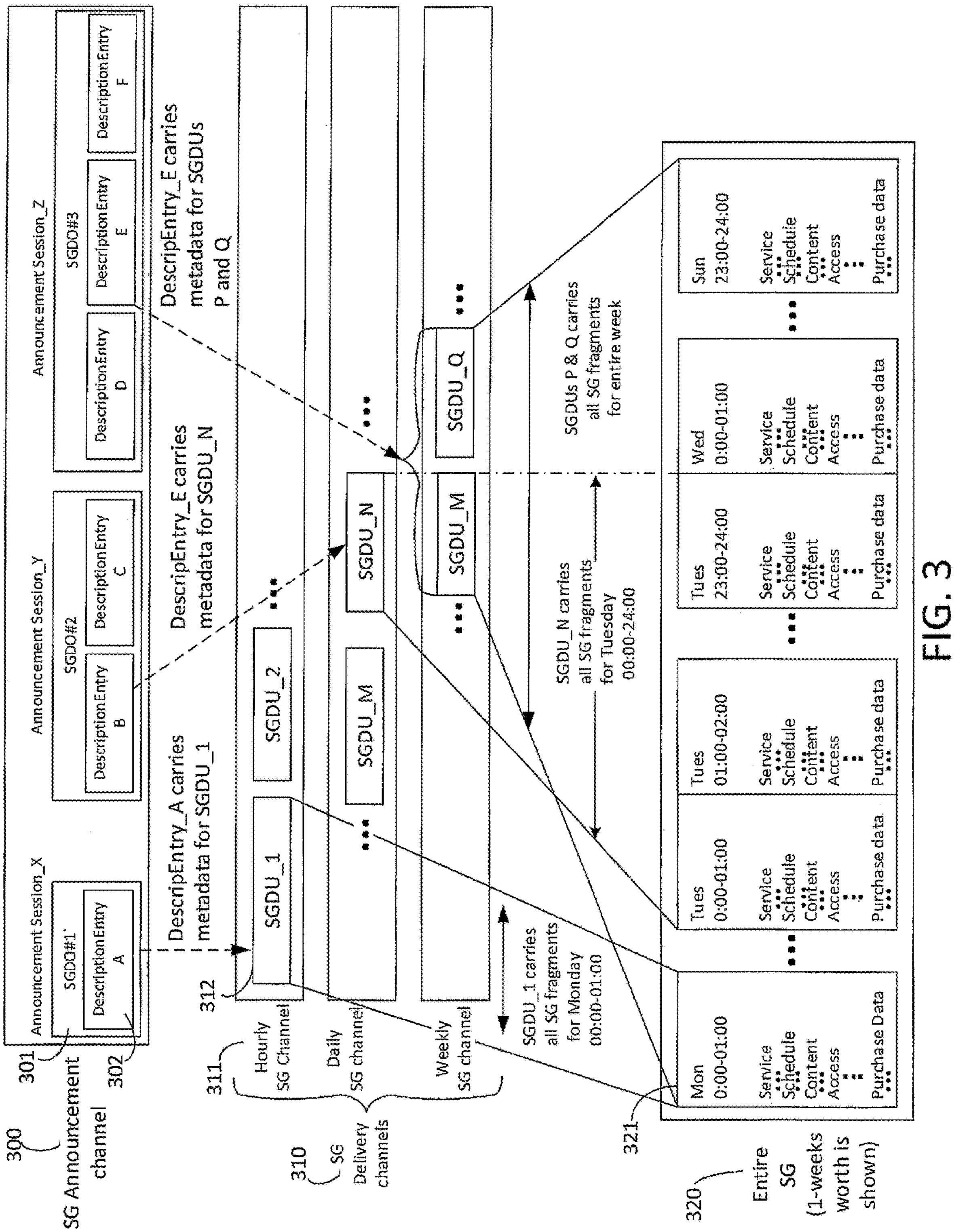
FIG. 3 is a block diagram illustrating a principle of the conventional service guide delivery method.

Referring to FIG. 3, an exemplary block diagram illustrates aspects of a service guide delivery technique. The Service Guide Deliver Descriptor fragment 201 may include the session information, grouping information, and notification message access information related to all fragments containing service information. When the mobile broadcast service-enabled terminal 105 turns on or begins to receive the service guide, it may access a Service Guide Announcement Channel (SG Announcement Channel) 300.

The SG Announcement Channel 300 may include at least one of SGDD 200 (e.g., SGDD #1, . . . , SGDD #2, SGDD #3), which may be formatted in any suitable format, such as that illustrated in Service Guide for Mobile Broadcast Services, Open Mobile Alliance, Version 1.0.1, Jan. 9, 2013 and/or Service Guide for Mobile Broadcast Services, open Mobile Alliance, Version 1.1, Oct. 29, 3013; both of which are incorporated by reference in their entirety. The descriptions of elements and attributes constituting the Service Guide Delivery Descriptor fragment 201 may be reflected in any suitable format, such as for example, a table format and/or in an eXtensible Markup Language (XML) schema.

The actual data is preferably provided in XML format according to the SGDD fragment 201. The information related to the service guide may be provided in various data formats, such as binary, where the elements and attributes are set to corresponding values, depending on the broadcast system.

The terminal 105 may acquire transport information about a Service Guide Delivery Unit (SGDU) 312 containing fragment information from a DescriptorEntry of the SGDD fragment received on the SG Announcement Channel 300.

The DescriptorEntry 302, which may provide the grouping information of a Service Guide includes the "GroupingCriteria", "ServiceGuideDeliveryUnit", "Transport", and AlternativeAccessURI". The transport-related channel information may be provided by the "Transport" or "AlternativeAccessURI", and the actual value of the corresponding channel is provided by "ServiceGuideDeliveryUnit". Also, upper layer group information about the SGDU 312, such as "Service" and "Genre", may be provided by "GroupingCriteria". The terminal 105 may receive and present all of the SGDUs 312 to the user according to the corresponding group information.

Once the transport information is acquired, the terminal 105 may access all of the Delivery Channels acquired from a DescriptorEntry 302 in an SGDD 301 on an SG Delivery Channel 310 to receive the actual SGDU 312. The SG Delivery Channels can be identified using the "GroupingCriteria". In the case of time grouping, the SGDU can be transported with a time-based transport channel such as an Hourly SG Channel 311 and a Daily SG Channel. Accordingly, the terminal 105 can selectively access the channels and receive all the SGDUs existing on the corresponding channels. Once the entire SGDU is completely received on the SG Delivery Channels 310, the terminal 105 checks all the fragments contained in the SGDUs received on the SG Delivery Channels 310 and assembles the fragments to display an actual full service guide 320 on the screen which can be subdivided on an hourly basis 321.

In the conventional mobile broadcast system, the service guide is formatted and transmitted such that only configured terminals receive the broadcast signals of the corresponding broadcast system. For example, the service guide information transmitted by a DVB-H system can only be received by terminals configured to receive the DVB-H broadcast.

The service providers provide bundled and integrated services using various transmission systems as well as various broadcast systems in accordance with service convergence, which may be referred to as multiplay services. The broadcast service providers may also provide broadcast services on IP networks. Integrated service guide transmission/reception systems may be described using terms of entities defined in the 3GPP standards and OMA BCAST standards (e.g., a scheme). However, the service guide/reception systems may be used with any suitable communication and/or broadcast system.

Referring to FIG. 4, the scheme may include, for example, (1) Name; (2) Type; (3) Category; (4) Cardinality; (5) Description; and (6) Data type. The scheme may be arranged in any manner, such as a table format of an XML format.

The "name" column indicates the name of an element or an attribute. The "type" column indicates an index representing an element or an attribute. An element can be one of E1, E2, E3, E4, . . . , E[n]. E1 indicates an upper element of an entire message, E2 indicates an element below the E1, E3 indicates an element below E2, E4 indicates an element below the E3, and so forth. An attribute is indicated by A. For example, an "A" below E1 means an attribute of element E1. In some cases the notation may mean the following E=Element, A=Attribute, E1=sub-element, E2=sub-element's sub-element, E[n]=sub-element of element[n-1]. The "category" column is used to indicate whether the element or attribute is mandatory. If an element is mandatory, the category of the element is flagged with an "M". If an element is optional, the category of the element is flagged with an "O". If the element is optional for network to support it the element is flagged with a "NO". If the element is mandatory for terminal to support it is flagged with a TM. If the element is mandatory for network to support it the element is flagged with "NM". If the element is optional for terminal to support it the element is flagged with "TO". If an element or attribute has cardinality greater than zero, it is classified as M or NM to maintain consistency. The "cardinality" column indicates a relationship between elements and is set to a value of 0, 0 . . . 1, 1, 0 . . . n, and 1 . . . n. 0 indicates an option, 1 indicates a necessary relationship, and n indicates multiple values. For example, 0 . . . n means that a corresponding element can have no or n values. The "description" column describes the meaning of the corresponding element or attribute, and the "data type" column indicates the data type of the corresponding element or attribute.

A service may represent a bundle of content items, which forms a logical group to the end-user. An example would be a TV channel, composed of several TV shows. A 'Service' fragment contains the metadata describing the Mobile Broadcast service. It is possible that the same metadata (i.e., attributes and elements) exist in the 'Content' fragment(s) associated with that 'Service' fragment. In that situation, for the following elements: 'ParentalRating', 'TargetUserProfile', 'Genre' and 'BroadcastArea', the values defined in 'Content' fragment take precedence over those in 'Service' fragment.

The program guide elements of this fragment may be grouped between the Start of program guide and end of program guide cells in a fragment. This localization of the elements of the program guide reduces the computational complexity of the receiving device in arranging a programming guide. The program guide elements are generally used for user interpretation. This enables the content creator to provide user readable information about the service. The terminal should use all declared program guide elements in this fragment for presentation to the end-user. The terminal may offer search, sort, etc. functionalities. The Program Guide may consist of the following service elements: (1) Name; (2) Description; (3) AudioLanguage; (4) TextLanguage; (5) ParentalRating; (6) TargetUserProfile; and (7) Genre.

The "Name" element may refer to Name of the Service, possibly in multiple languages. The language may be expressed using built-in XML attribute 'xml:lang'.

The "Description" element may be in multiple languages and may be expressed using built-in XML attribute 'xml:lang'.

The "AudioLanguage" element may declare for the end users that this service is available with an audio track corresponding to the language represented by the value of this element. The textual value of this element can be made available for the end users in different languages. In such a case the language used to represent the value of this element may be signaled using the built-in XML attribute 'xml:lang', and may include multi-language support. The AudioLanguage may contain an attribute languageSDPTag.

The "languageSDPTag" attribute is an identifier of the audio language described by the parent 'AudioLanguage' element as used in the media sections describing the audio track in a Session Description. Each 'AudioLanguage' element declaring the same audio stream may have the same value of the 'languageSDPTag'.

The "TextLanguage" element may declare for the end user that the textual components of this service are available in the language represented by the value of this element. The textual components can be, for instance, a caption or a sub-title track. The textual value of this element can be made available for the end users in different languages. In such a case the language used to represent the value of this element may be signaled using the built-in XML attribute 'xml:lang', and may include multi-language support. The same rules and constraints as specified for the element 'AudioLanguage' of assigning and interpreting the attributes languageSDPTag' and 'xml:lang' may be applied for this element.

The "languageSDPTag" attribute is an identifier of the text language described by the parent 'TextLanguage' element as used in the media sections describing the textual track in a Session Description.

The "ParentalRating" element may declare criteria parents and might be used to determine whether the associated item is suitable for access by children, defined according to the regulatory requirements of the service area. The terminal may support 'ParentalRating' being a free string, and the terminal may support the structured way to express the parental rating level by using the 'ratingSystem' and 'ratingValueName' attributes.

The "ratingSystem" attribute may specify the parental rating system in use, in which context the value of the 'ParentalRating' element is semantically defined. This allows terminals to identify the rating system in use in a non-ambiguous manner and act appropriately. This attribute may be instantiated when a rating system is used. Absence of this attribute means that no rating system is used (i.e. the value of the 'ParentalRating' element is to be interpreted as a free string).

The "ratingValueName" attribute may specify the human-readable name of the rating value given by this ParentalRating element.

The "TargetUserProfile" may specify elements of the users whom the service is targeting at. The detailed personal attribute names and the corresponding values are specified by attributes of 'attributeName' an 'attributeValue'. Amongst the possible profile attribute names are age, gender, occupation, etc. (subject to national/local rules & regulations, if present and as applicable regarding use of personal profiling information and personal data privacy). The extensible list of 'attributeName' and 'attributeValue' pairs for a particular service enables end user profile filtering and end user preference filtering of broadcast services. The terminal may be able to support 'TargetUserProfile' element. The use of 'TargetUserProfile' element may be an "opt-in" capability for users. Terminal settings may allow users to configure whether to input their personal profile or preference and whether to allow broadcast service to be automatically filtered based on the users' personal attributes without users' request. This element may contain the following attributes: attributeName and attributeValue.

The "attributeName" attribute may be a profile attribute name.

The "attributeValue" attribute may be a profile attribute value.

The "Genre" element may specify classification of service associated with characteristic form (e.g. comedy, drama). The OMA BCAST Service Guide may allow describing the format of the Genre element in the Service Guide in two ways. The first way is to use a free string. The second way is to use the "href" attributes of the Genre element to convey the information in the form of a controlled vocabulary (classification scheme as defined in [TVA-Metadata] or classification list as defined in [MIGFG]). The built-in XML attribute xml:lang may be used with this element to express the language. The network may instantiate several different sets of 'Genre' element, using it as a free string or with a 'href' attribute. The network may ensure the different sets have equivalent and nonconflicting meaning, and the terminal may select one of the sets to interpret for the end-user. The 'Genre' element may contain the following attributes: type and href.

The "type" attribute may signal the level of the 'Genre' element, such as with the values of "main", "second", and "other".

The "href" attribute may signal the controlled vocabulary used in the 'Genre' element.

In order to deliver the service guide data fragments from the network to the receiver the network needs to be able to place the fragments into the underlying transport frames. The network is provided with the capability of delivering more than one fragment as a atomic unit at one time but on the other hand the network is not restricted to deliver all the fragments at once either. For the receivers to correctly receive and process any collection of fragments as one delivery unit the network may comply with the following:

In one embodiment the Service Guide Delivery Unit structure, as defined in FIG. 4, may be used for encapsulating Service Guide fragments for transport.

In FIG. 4, uimsbfN may refer to unsigned Nbit integer, most significant bit first, bytestring may refer to array of bytes, each occupying eight bits, and bitstring may refer to array of bits, with length being multiple of eight.

In FIG. 4 the semantics of various elements may be as defined in FIGS. 5A and 5B.

In one embodiment The Service Guide Delivery Unit (SGDU) structure is the transport container for ATSC 3.0 service guide fragments. Broadcast Systems and the Reference Receiver may support the Service Guide Delivery Unit structure as specified FIG. 4. and associated semantics defined previously. Additionally or instead of in another embodiment of the the semantics defined above may be modified, for example, with one or more of the following constraints:

(1) The extension_offset field of the UnitHeader structure may be equal to zero in SGDUs conforming to this version of this specification. The Reference Receiver may be able to process an SGDU with a non-zero value for extension_offset (e.g., by ignoring extensions)

(2) The fragmentEncoding[i] field may not take value of 1 or 2 or 3 for any value of i in the range 0 to n_o_service_guide_fragments in a SGDU. There may be at least one value of i in the range 0 to n_o_service_guide_fragments for which fragmentEncoding[i] may be equal to 0 in each SGDU conforming to this version of this specification. The reference receiver may ignore fragment data associated with a non-zero fragmentEncoding[i] field value for any value of i in the range 0 to n_o_service_guide_fragments.

(3) For any value of i in the range 0 to n_o_service_guide_fragments, when fragmentEncoding[i] is equal to 0, the fragmentType field may not take value of 4, 5, 6, 7, 8, 9 for a SGDU. There may be at least one value of i in the range 0 to n_o_service_guide_fragments for which fragmentType value may be equal to 0 or 1 or 2 or 3 and fragmentEncoding [i] may be equal to 0 in each SGDU conforming to this version of this specification. The reference receiver may ignore data in XMLFragment field with associated fragmentType field with value equal to 0 or greater than 3 for any value of i in the range 0 to n_o_service_guide_fragments when fragmentEncoding[i] is equal to 0.

Additional constraints for various elements in service guide delivery unit that may be used may be described next.

(1) Constraints are specified for fragmentType field when fragmentEncoding[i] is equal to 0. Also reference receiver behavior is described for handling various fragmentType field values.

(2) Constraints are specified for fragmentEncoding [i] field. Also reference receiver behavior is described for handling various fragmentEncoding [i] field values.

These constraints are described below, including several different variants of the constraints.

Constraints on fragmentEncoding field:

Syntax and semantics for fragmentEncoding[i] as defined in OMA BCAST service guide 1.0.1 inside a SGDU is as follows:

fragmentEncoding[i] signals the encoding of the i:th Service Guide fragment, with the one or more of the following values:

0—XML encoded OMA BCAST Service Guide fragment

1—SDP fragment

2—MBMS User Service Bundle Description (USBD) as specified in [26,346] (see 5.1.2.4 'SessionDescription' element)

3—XML encoded Associated Delivery Procedure as specified in [BCAST10-Distribution] section 5.3.4.

4-127—reserved for future BCAST extensions 128-255—available for proprietary extensions It is proposed that the SDP fragment (with fragmentEncoding[i] value equal to 1), and MBMS User Service Bundle Description (USBD) (with fragmentEncoding[i] value equal to 2) and XML encoded Associated Delivery Procedure (with fragmentEncoding[i] value equal to 3) may not be present in a SGDU. But the reference receiver may be able to ignore these values if received.

For this one or more of following constraints are proposed on fragmentEncoding[i] field:

(1) The fragmentEncoding[i] field may not take value of 1 or 2 or 3 for any value of i in the range 0 to n_o_service_guide_fragments in a SGDU.

(2) There may be at least one value of i in the range 0 to n_o_service_guide_fragments for which fragmentEncoding [i] may be equal to 0 in each SGDU conforming to this version of this specification.

(3) The reference receiver may ignore fragment data associated with a non-zero fragmentEncoding[i] field value for any value of i in the range 0 to n_o_service_guide_fragments.

In a variant embodiment:

(1) The reference receiver may be able to process a SGDU with a non-zero fragmentEncoding[i] field value for any value of i in the range 0 to n_o_service_guide_fragments (e.g., by ignoring fragment data associated with non-zero fragmentEncoding[i]).

In a variant embodiment:

The reference receiver may be able to process a SGDU with a non-zero fragmentEncoding[i] field value for any value of i in the range 0 to n_o_service_guide_fragments.

Constraints on fragmentType field:

Syntax and semantics for fragmentType field as defined in OMA BCAST service guide 1.0.1 inside a SGDU may be as follows:

fragmentType[i] field signals the type of an XML encoded BOAST Service Guide fragment, with one or more of the following values:

0—unspecified

1—'Service' Fragment

2—'Content' fragment

3—'Schedule' Fragment

4—'Access' Fragment

5—'PurchaseItem' Fragment

6—'PurchaseData' Fragment

7—'PurchaseChannel' Fragment

8—'PreviewData' Fragment

9—'InteractivityData' Fragment 10-127—reserved for BOAST extensions 128-255—available for proprietary extensions It is proposed that the 'Access' fragment (with fragmentType value equal to 4), 'PurchaseItem' fragment (with fragmentType value equal to 5), 'PurchaseData' fragment (with fragmentType value equal to 6), 'PurchaseChannel' fragment (with fragmentType value equal to 7), 'PreviewData' fragment (with fragmentType value equal to 8), 'InteractivityData' fragment (with fragmentEncoding[i] value equal to 9), may not be present in a SGDU. But the reference receiver may be able to ignore these values if received.

For this one or more of the following constraints are proposed on fragmentType field:

(1) For any value of i in the range 0 to n_o_service_guide_fragments, when fragmentEncoding[i] is equal to 0, the fragmentType field may not take value of 4, 5, 6, 7, 8, 9 for a SGDU.

(2) There may be at least one value of i in the range 0 to n_o_service_guide_fragments for which fragmentType value may be equal to 0 or 1 or 2 or 3 and fragmentEncoding [i] may be equal to 0 in each SGDU conforming to this version of this specification.

(3) The reference receiver may ignore data in XMLFragment field with associated fragmentType field with value equal to 0 or greater than 3 for any value of i in the range 0 to n_o_service_guide_fragments when fragmentEncoding [i] is equal to 0.

In a variant embodiment:

(1) The reference receiver may be able to process (e.g., by ignoring data in XML-Fragment field with associated fragmentType field with value equal to 0 or greater than 3) a SGDU with fragmentType field value equal to 0 or greater than 3 for any value of i in the range 0 to n_o_service_guide_fragments when fragmentEncoding[i] is equal to 0.

In another variant embodiment:

(1) The reference receiver may be able to process an SGDU with fragmentType field value in the range of 0 to 255 for any value of i in the range 0 to n_o_service_guide_fragments.

In additional variant embodiment one or more of the following constraints may be enforced:

(1) The fragmentEncoding[i] field in a SGDU may not take value of 1, 2, 3. The reference receiver may be able to ignore values other than 0 for fragmentEncoding[i] field.

(2) The fragmentType field in a SGDU may not take value 4, 5, 6, 7, 8, 9.

(3) The reference receiver may be able to ignore these values (e.g. 4, 5, 6, 7, 8, 9) for fragmentEncoding[i] field if received.

In another variant embodiments one or more of the following constraints may be enforced:

(1) The fragmentEncoding[i] field in a SGDU may not take value of 1 (SDP fragment), 2 (MBMS USBD fragment), 3 (XML encoded associated delivery procedure). The reference receiver may be able to ignore values other than 0 for fragmentEncoding[i] field.

(2) The fragmentType filed in a SGDU may not take value 4 ('Access' fragment), 5 ('PurchaseItem' fragment), 6 ('PurchaseData' fragment), 7 ('PurchaseChannel' fragment), 8 ('PreviewData' fragment), 9 ('InteractivityData' fragment). The reference receiver may be able to ignore these values (e.g. 4, 5, 6, 7, 8, 9) for fragmentType field if received.

In another variant embodiments one or more of the following constraints may be enforced:

(1) The fragmentEncoding[i] may not allow including SDP fragment, MBMS USBD fragment, XML encoded associated delivery procedure in a SGDU conforming to this version of this specification. The reference receiver may be able to ignore values other than 0 for fragmentEncoding[i] field in a SGDU.

(2) The fragmentType may not allow including 'Access' fragment, 'PurchaseItem' fragment, 'PurchaseData' fragment, 'PurchaseChannel' fragment, 'PreviewData' fragment, 'InteractivityData' fragment in a SGDU conforming to this version of this specification. The reference receiver may be able to ignore these values for fragmentType field in a SGDU if received.

In another variant embodiments one or more of the following constraints may be enforced.

(1) The fragmentEncoding[i] field may be equal to zero in SGDUs conforming to this version of this specification. The reference receiver may be able to ignore fragment data inside a SGDU section with values other than 0 for fragmentEncoding[i] field.

(2) The fragmentType field value may be equal to 1 or 2 or 3 in SGDUs conforming to this version of this specification. The reference receiver may be able to ignore fragment data (XMLfragment field) inside a SGDU section with fragmentType field value less than 1 or greater than 3.

In another variant embodiments one or more of the following constraints may be enforced.

(1) The fragmentEncoding[i] field may be equal to zero in SGDUs conforming to this version of this specification. The Reference Receiver may be able to process an SGDU with a non-zero value for fragmentEncoding[i] field (e.g., by ignoring fragment data associated with non-zero fragmentEncoding[i]).

In another embodiment:

(1) The Reference Receiver not fail to process an SGDU with a non-zero value for fragmentEncoding[i] field (e.g., by ignoring fragment data associated with non-zero fragmentEncoding[i]).

(2) The fragmentType field value may be equal to 1 or 2 or 3 in SGDUs conforming to this version of this specification. The reference receiver may be able to ignore fragment data (XMLfragment field) inside fragmentType field with value less than 1 or greater than 3. The Reference Receiver may be able to process an SGDU with a fragmentType field with value less than 1 or greater than 3 (e.g., by ignoring fragment data (XMLfragment field) with fragmentType field with value less than 1 or greater than 3).

In another embodiment:

(1) The Reference Receiver not fail to process an SGDU with a fragmentType field with value less than 1 or greater than 3 (e.g., by ignoring fragment data (XMLfragment field) with fragmentType field with value less than 1 or greater than 3).

In some embodiments fragmentType field may instead be referred to as fragmentType[i] field. In this case the index i may range from 0 to n_o_service_guide_fragments. In this case all the above described constraints with fragmentType replaced by fragmentType[i] apply.

(1) In some embodiment one or more of the above constraints will apply to SGDUs conforming to this version of this specification.

(2) In some embodiment the term "SGDU conforming to this version of this specification" may be replaced by "SGDU" above.

(3) In some embodiments the term "SGDU" may be replaced by "SGDUs conforming to this version of this specification" above.

(4) In some embodiment the term "associated with" may be replaced by "inside" above.

(5) In some embodiments the term "may be able to ignore" may be replaced by the term "may ignore" above.

It is to be understood that the claims are not limited to the precise configuration and components illustrated above. Various modifications, changes and variations may be made in the arrangement, operation and details of the systems, methods, and apparatus described herein without departing from the scope of the claims.

The invention claimed is:

1. A method for decoding service guide fragments comprising:

(a) decoding a service guide delivery unit structure that is a transport container for said service guide fragments;

(b) decoding a total number of said service guide fragments in said service guide delivery unit structure;

(c) decoding fragment encoding fields, within said service guide delivery unit structure, each of which has a value signaling an encoding of a one of said service guide fragments corresponding to an index i, (d) decoding a fragment type field, within said service guide delivery unit structure, which signals a data type of said service guide fragment;

(e) decoding an XML fragment field, within said service guide delivery unit structure, which is a string containing an actual XML data of said service guide fragment without a termination character, where a value of said fragment type field does not take a value of 4, 5, 6, 7, 8 or 9 when a value of one of said fragment encoding fields is equal to 0, wherein there is at least one value of said index i in a range of 0 to said total number for which said value of said fragment type field is equal to 0, 1, 2 or 3, and a value of said fragment encoding field for said index i is equal to 0 in particular service guide delivery unit structure;

(f) ignoring data in said XML fragment field with said fragment type field with value equal to 0 or greater than 3, for any value of said index i in said range 0 to said total number, when a value of said fragment encoding field is equal to 0; and (g) decoding said service guide fragment by using said fragment type field and said XML fragment field.

* * * * *